CLAYTON E. HUNT JR.
INVENTOR.
BY R. Frank Smith
Lloyd F. Seebach
ATTORNEY & AGENT Oct. 13, 1959 C. E. HUNT, JR 2,908,756

DEVICE FOR PROVIDING PREDETERMINED SPACING IN FACSIMILE APPARATUS

Filed Dec. 23, 1957 7 Sheets-Sheet 2

CLAYTON E. HUNT JR.
INVENTOR.

BY R. Frank Smith

Lloyd F. Seebach
ATTORNEY & AGENT

Oct. 13, 1959 C. E. HUNT, JR 2,908,756

DEVICE FOR PROVIDING PREDETERMINED SPACING IN FACSIMILE APPARATUS

Filed Dec. 23, 1957 7 Sheets-Sheet 3

CLAYTON E. HUNT JR.
INVENTOR.
BY R. Frank Smith
Lloyd F. Seebach
ATTORNEY & AGENT Oct. 13, 1959 C. E. HUNT, JR 2,908,756

DEVICE FOR PROVIDING PREDETERMINED SPACING IN FACSIMILE APPARATUS

Filed Dec. 23, 1957 7 Sheets-Sheet 4

CLAYTON E. HUNT JR.
INVENTOR.
BY R. Frank Smith
Lloyd F. Seebach
ATTORNEY & AGENT CLAYTON E. HUNT JR.
INVENTOR.
BY R. Frank Smith
Lloyd F. Seebach
ATTORNEY & AGENT CLAYTON E. HUNT JR
INVENTOR.
BY R. Frank Smith
Lloyd F. Seebach
ATTORNEY & AGENT CLAYTON E. HUNT JR.
INVENTOR.
BY R. Frank Smith
Lloyd F. Seebach
ATTORNEY & AGENT United States Patent Office 2,908,756

Patented Oct. 13, 1959

2,908,756

DEVICE FOR PROVIDING PREDETERMINED SPACING IN FACSIMILE APPARATUS

Clayton E. Hunt, Jr., Rochester, N.Y., assignor to Eastman Kodak Company, Rochester, N.Y., a corporation of New Jersey Application December 23, 1957, Serial No. 704,471

11 Claims. (Cl. 178—30)

The present invention relates to facsimile apparatus and more particularly to such apparatus as used for printing address labels from punched cards wherein a predetermined spacing is provided between each group of characters irrespective of the spacing between corresponding groups on the punched cards, this application being a continuation-in-part of my application Serial No. 614,257, filed October 5, 1956.

In U.S. Patent No. Re. 23,713 in the name of C. E. Hunt, Jr., U.S. Patent No. 2,659,652 in the name of Russell G. Thompson and U.S. patent application Serial No. 394,926 in the names of R. G. Thompson and C. E. Hunt, Jr. and Serial No. 474,169 in the name of C. E. Hunt, Jr., apparatus is described for deriving visual representations of characters on a medium from code arranged on cards in successive columns and representative of the characters. In such apparatus discrete cards are fed successively from a stack through a sensing station wherein the successive columns of code are analyzed for obtaining signals representative of the code. By circuit means these signals are converted into electrical signals which are utilized to energize either singly or in combination a plurality of recorders for producing a visual representation of the characters on the medium.

As is well known, the Hollerith system or IBM system utilizes a card having eighty vertical columns each with twelve possible code designations. For use in specific applications, a card may be divided into sections, or groups of columns, known as areas or fields which define that portion of the card in which information of a certain kind will always appear. The Remington Rand card has ninety vertical columns each with six punching positions. The card is divided into an upper and lower section, each section extending across the length of the card to provide forty-five columns and six positions in each section. Each section may also be divided into areas or fields in which certain information will be recorded.

Irrespective of the type of card employed, it is evident that the information punched into these areas will not always require all of the possible code positions allocated to such information. For example, a title preceding the first name may be M, Mr, Rev, or Miss so that sufficient code columns must be allocated on the basis of the largest possible number of characters. However, the space between the title and first name will, therefore, vary depending on the number of characters in the title. In the case of designating a city, Buffalo requires seven code columns whereas San Francisco requires thirteen. In the latter instance, the space between the last city character and the first state character will vary by at least seven positions. If these variations in spacing are not compensated for in printing of address labels, the spacing between information in the different areas will appear on the label as coded on the card and, in most instances, will not permit printing of the required information on any one line due to the fact that the number of characters that can be printed on any one line of the label is limited by the length of the label.

The present invention compensates for these discrepancies between groups of characters by providing a uniform spacing between said groups irrespective of the spacing between such groups as designated by the code punched in the card. This is accomplished by providing an auxiliary memory which is associated with each memory means corresponding to a designated code column. As a medium or card is scanned, each column of perforated or punched-out code provides a group of signals which are representative of and individual to a particular character. The signals from each column are read into a memory means associated with that particular column of code, and if no signal is read in, then a signal is read into the auxiliary memory associated with the memory means of the next code column. A ring chain having a unit associated with each memory means is responsive to periodic pulses for causing read-out of the signals stored in each memory means and read-out of any signal stored in the next auxiliary memory. By means of a control circuit for each group of code columns in an area, any signal read-out of any one of the auxiliary memories associated with the same area causes the control circuit to block the remaining units of the ring chain so that the succeeding periodic pulse causes read-out of the signals in the memory means associated with a code column in the next and adjacent area. With this arrangement, which is described in more detail hereinafter, a predetermined and equal spacing between each group of characters can be attained irrespective of the code spacing on the cards.

The primary object of the invention is, therefore, to provide a device for facsimile apparatus by which a predetermined and equal spacing is attained between printed groups of characters regardless of the spacing between said groups as arranged in code columns on a medium.

Another object of the invention is to provide a device for facsimile apparatus by which a predetermined and equal spacing is attained between printed groups of characters by read-out of an auxiliary memory associated with the memory means of the next code column in the group, whereby read-out of a signal from said auxiliary memory automatically shifts the next read-out to the first code column of the next and adjacent group with said predetermined spacing between the last character in one group and the first character in the next group.

And still another object of the invention is to provide a device for facsimile apparatus in which an auxiliary memory associated with each memory means for each column of code whereby a signal is read into said auxiliary memory means whenever a signal is not read into the memory means, the signal read-out of any one of said auxiliary memories causing read-out of the signals in the memory associated with the next and adjacent area whereby a predetermined spacing between the last character in the one area and the first character in the next and adjacent area is attained automatically.

Other objects and advantages will be apparent to those skilled in the art by the description which follows:

Reference is now made to the accompanying drawings wherein like reference numerals designate like parts and wherein.

Figures 1, 2, 12:
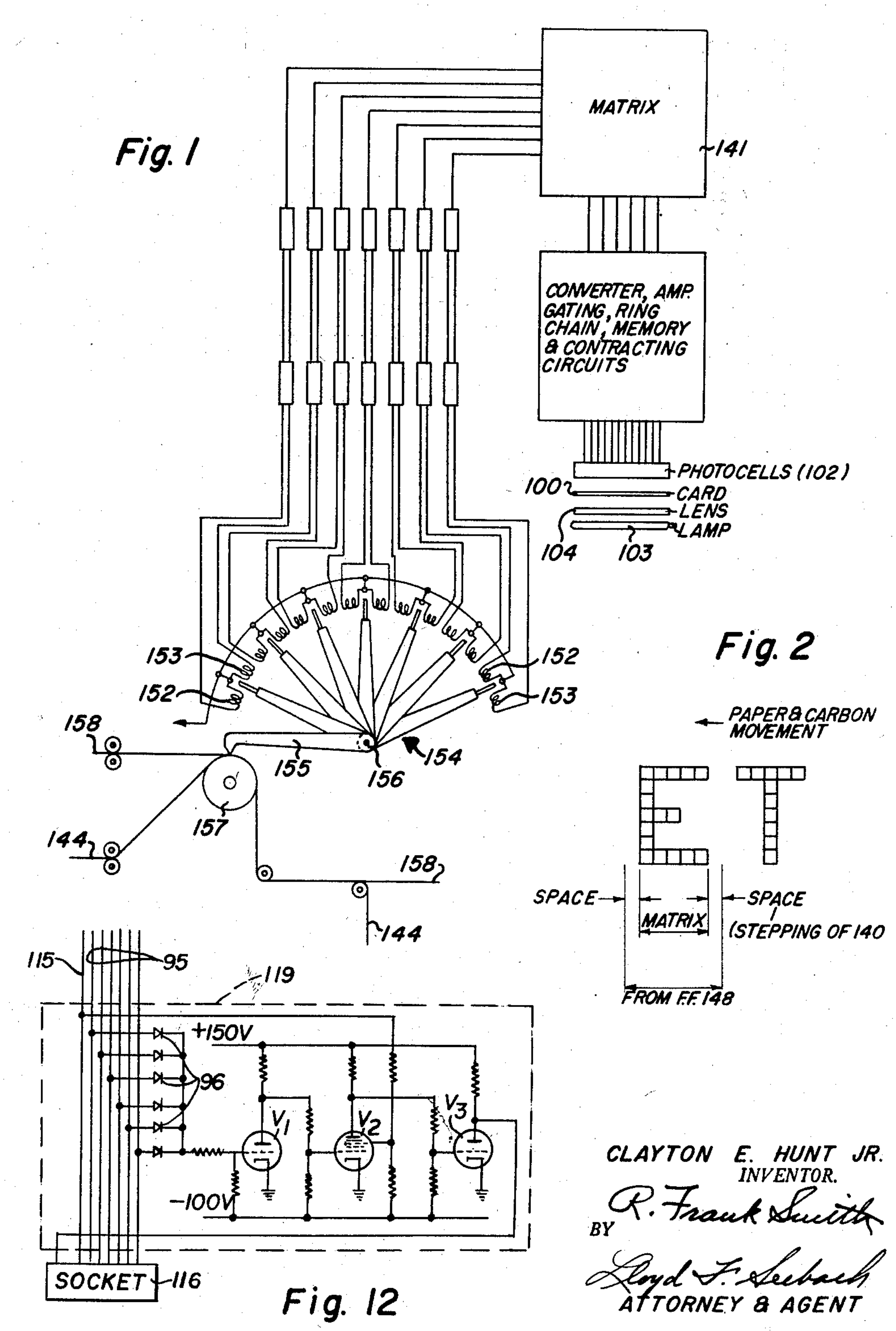
Fig. 1 is a diagrammatic view of the printing apparatus showing the means for deriving the electrical signals from the punched card and the recording elements actuated by said signals.
Fig. 2 is an enlarged view of two characters as reproduced by said recording elements and showing the formation of said characters from a 5 x 7 dot rectangle.
Fig. 12 is a detail circuit diagram of one of the circuits associated with the distribution means.

The apparatus to be described for the purpose of disclosing the invention has been designated to record or print all characters with a definition in height of seven lines and with five-line definition in width, see Fig. 2. More or fewer lines may be employed as desired, but it is believed that 7 x 5 definition gives the lowest resolving power which can be tolerated when it is desirable to print characters which are easily legible. For printing characters as well as digits, a six element binary code for the coded signals is preferred. These signals may originate in any manner but the invention contemplates their derivation from a medium such as punched tabulating cards. Any other code, of course, may be used as long as it meets the requirement that unique voltage patterns can be derived from each coded character signal.

Card feeding mechanisms for moving cards with respect to a sensing means as well as advancing means for recording tapes or mediums are so well known that a detailed description thereof is deemed to be unnecessary.

Figure 3:
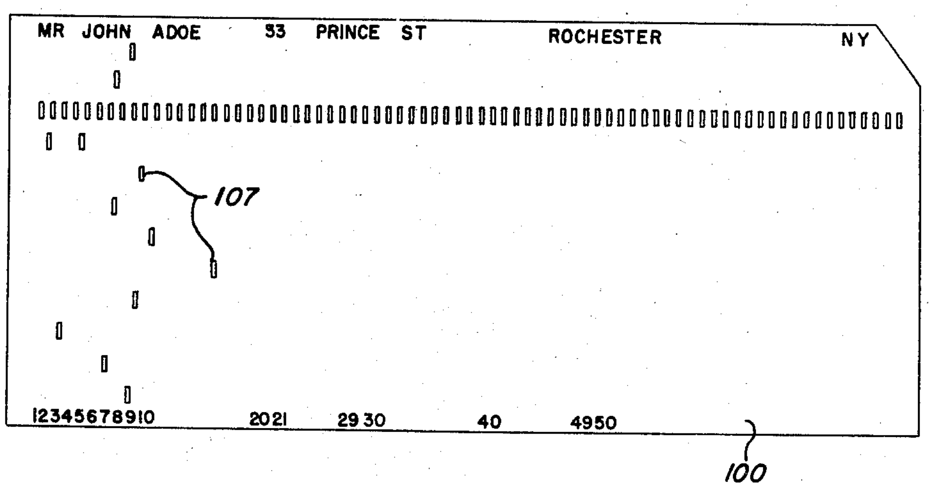
Fig. 3 is a detail view of a punched card showing the division of the card into areas or fields for each portion of the name and address.
Figure 7:
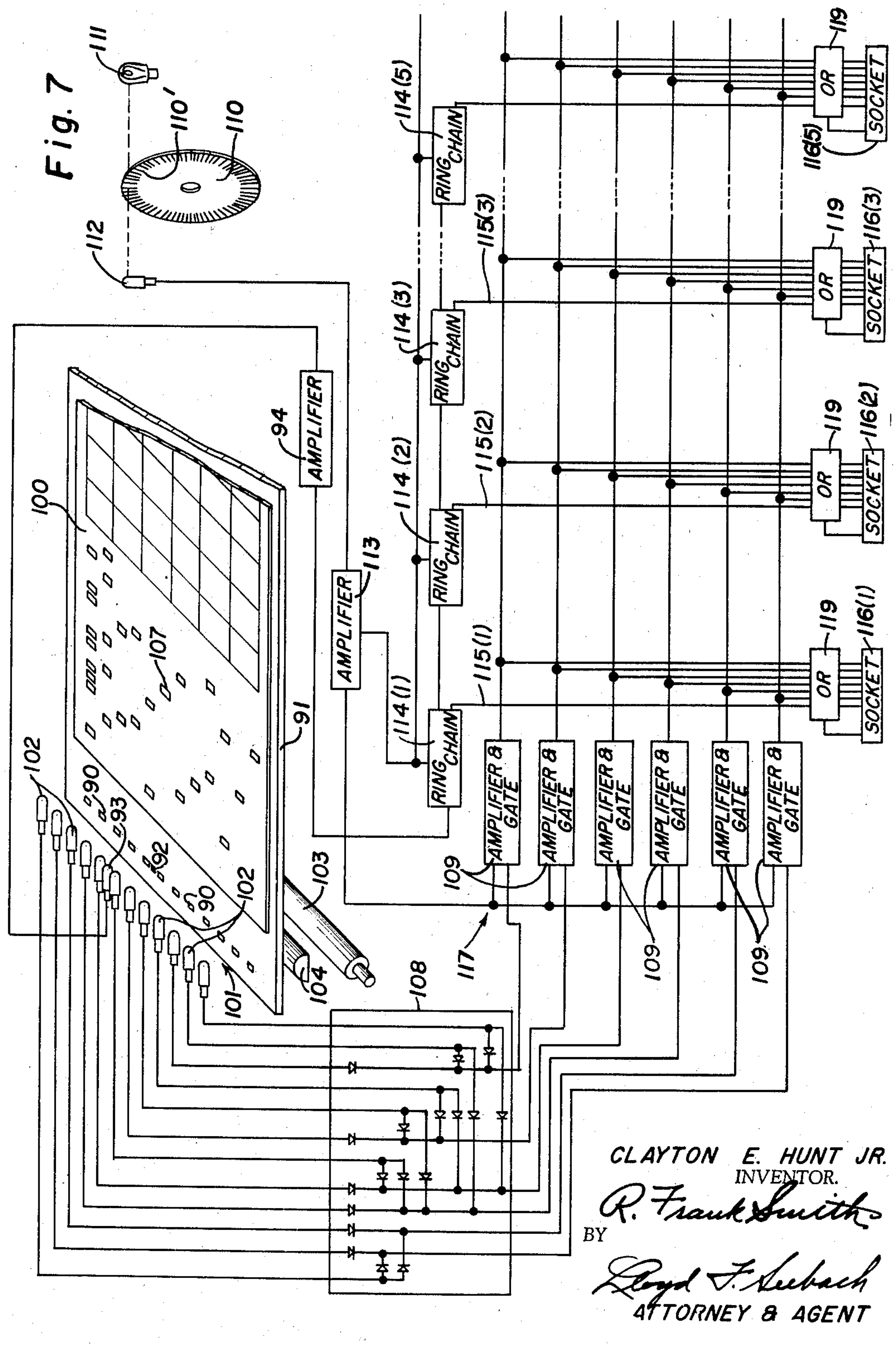
Fig. 7 is a schematic diagram of the apparatus and circuits for receiving and distributing the coded signals derived from the punched cards.

With reference to Figs. 1, 3 and 7, the punched card 100 is divided into areas or fields in which the title, first name, middle initial, surname, etc., appear in successively coded columns by perforating the card in a well-known manner. Cards 100 are fed from the bottom of a stack in a lengthwise direction and at a constant speed into a scanning station 101. For the type of card shown, a group of light-responsive cells 102 are arranged above and across the path of card movement, said group being spaced above the card and aligned with apertures 90 in plate 91 over which cards 100 are moved so that columns of code corresponding to the name, address and city and state can be read successively as the card is moved through the scanning station. Lamp 103 and lens 104 are arranged on the under side of the plate 91 in alignment with apertures 90 and cells 102, lens 104 serving to spread the light from lamp 103 to provide uniform illumination for each column as it is scanned. Since the cards are moved continuously through scanning station 101 and past cells 102, the number of cells 102 energized in each row will vary with the code permitting light to be transmitted through apertures 90 and will provide signals which are individual to the character represented by the code. Also, since the printing of the lines on the address label occur simultaneously, the description which is to be given with respect to the first line is to be understood as also being applicable to the other two lines. Although a single set of cells 102 is utilized for reading the code columns on the entire card, each area of the card is associated with a memory and printer for the respective lines on the label. As a result, the code for each area is read successively into the memories but on read-out, the signals stored in each memory are read out simultaneously.

Figure 4:
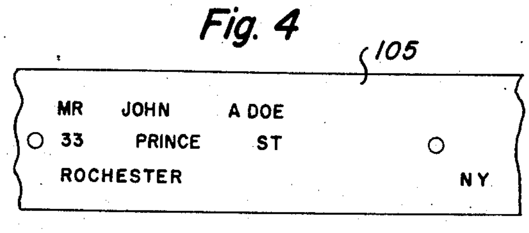
Figs. 4 and 5 are detail views of an address label printed without and with a predetermined spacing between the groups of characters punched into the card shown in Fig. 3.
Figure 5:
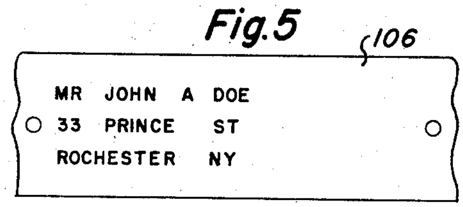

With reference to Figs. 3, 4 and 5, it will be noted that the name is not properly spaced on card 100 nor is it properly spaced on label 105 which represents a label printed from card 100 without the benefit of the invention. As is well known, the areas or fields of a punched card must be sufficiently large to accept some predetermined number of characters or digits in accordance with past experience. For example, the title preceding a name may be M, Mr, Mrs, Miss, Dr, Hon, Rev, etc., and from these it is evident that the number of characters vary from one to four. In the same manner, any one of the other groups such as the first name, surname, street number, etc., can vary and provision for this variation must be made. However, if no provision is made, then a label as shown in Fig. 4 is obtained in which the spacing between groups of characters and/or digits vary and are in accordance with the spacing of the corresponding columns of code on the card. Since an address label is of a fixed length, it is possible, as shown in Fig. 4, to have one group of characters not appear in the area of its respective label. By means of the invention, the spacing between groups of characters and/or digits is made uniform and, as a result, a label 106 is then obtained, as shown in Fig. 5.

As shown in Fig. 7, the pulses obtained by light transmitted through apertures 107 in cards 100 and onto cell 102 are directed to a conventional circuit 108 of diodes which converts the pulses for each column of code to pulses representative of a binary six code which, in turn, are delivered to the corresponding amplifier and gating circuits 109, which can be of the Rossi type shown in the text "High Speed Computing Devices" published by the McGraw-Hill Book Company. In order to insure synchronization of the card feed and the successive scanning of the columns of code on card 100, a disc 110 is provided with a number of radial slots 110' equivalent in number of the number of columns on the card and is geared or directly connected to the card feed. A light source 111 is arranged on one side of the disc 110 and a light responsive cell 112 on the other side thereof. The light transmitted through slots 110 and falling on cell 112 provides a pulse which is utilized as a synchronizing signal for each card column passing the rows of cells 102. The signals from cell 112 are delivered to amplifier 113 which, in turn, delivers the amplified signal to each of amplifier and gating circuits 109. As shown in Fig. 7, the circuits 108 and 109 are common to each column on card 100 but are shown only in conjunction with the first few columns of card 100 associated with the first line on the address label; however, circuits 109 are also associated with each of the other card columns. Each signal from amplifier 113 is, therefore, connected to each of circuits 109. The signals from cells 102 which are converted by circuit 108 are gated by the signal from amplifier 113 to make short pulses. The signals from amplifier 113 are also directed to ring chains 114 which are equivalent in number to the number of code columns on card 100 and have the property of being stepped along by the signal from amplifier 113 so that output pulses are delivered successively to leads 115 connected to sockets 116, each of sockets 116 corresponding to a code column on the card. In an arrangement, as shown in Fig. 7, the code columns on the card are scanned or sensed and each signal or group of signals derived from a column will be stepped by the single disc 110 and ring chain 114 to its respective socket 116.

The code distribution means or circuit 117 receives a start signal when a card is in a predetermined relation to scanning station 101, that is, at a time when the last column of code in the preceding card is past cells 102 and the first column of code in the next and succeeding card is approaching cells 102. This is accomplished by providing an aperture 92 in plate 91 which is arranged between any two of apertures 90. Aperture 92 is then covered and uncovered by the leading and trailing edges of each card moved through reading station 101. A light responsive cell 93 is aligned with aperture 92 and provides a signal which is delivered to ring chain 114(1) as a start signal by amplifier 94. Cells 102 derive a signal or a group of signals from the perforations in each code column as the card passes thereunder and these signals, which are based on the IBM system, are converted by circuit 108 into a binary six group of signals. The signals from circuit 108 are amplified and gated with the disc signal to insure exact synchronization and are delivered to socket 116. As a result, an electrical signal representative of the character coded in each column of card 100 is posted on one or more of the terminals of each socket 116 successively. Since each character or digit will be represented by the energization of a different combination of cells 102 associated with each section of card 100, the signals will be applied to the terminals on sockets 116 corresponding to the converted combination of said cells.

Figure 8:
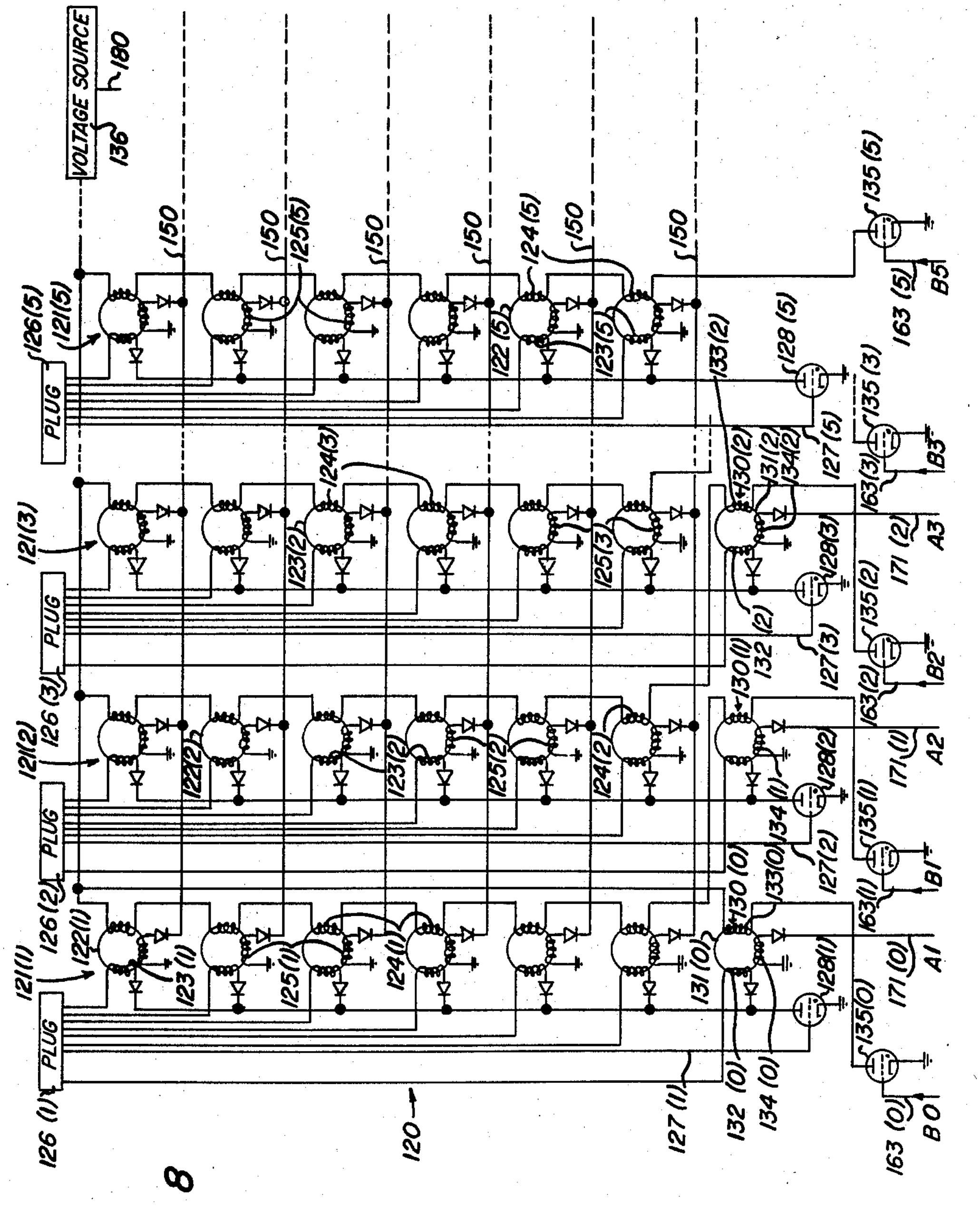
Fig. 8 is a schematic view of a portion of the circuits comprising the memory system.

Memory means 120, as shown in Fig. 8, comprises a plurality of static magnetic memory units 121 having cores 122, read-in coils 123, read-out coils 124 and output coils 125. Each of the units is arranged in assemblies or groups of six units in accordance with the number of bits in the binary code, and each group is associated with one of the code columns on card 100, the number of groups being equivalent to the number of code columns in each section. Each memory unit has the property that a pulse in coil 123 will magnetize core 122 in one direction and a pulse in coil 124 will magnetize the core in the opposite direction, coil 125 having an output only when the direction of magnetization is reversed. With reference to Fig. 7, it will be noted that an Or circuit 119, see Fig. 12, is provided between each of sockets 116 and circuit 117. The sockets 116 are engaged by plugs 126 and coils 123 are connected thereto for receiving any signal delivered to its respective terminal on socket 116, and lines 127 are connected in each instance to the control grid of thyratrons 128.

Or circuit 119, as shown in Fig. 12, comprises tubes V1, V2 and V3 which are interconnected to the output lines of circuits 109 and ring chains 114. Signals appear on one or a combination of lines 95 in accordance with the character read and no signal appears when a card column is unpunched, thereby indicating no character in that particular column. A synchronizing signal derived from ring chain 114 appears on line 115 in coincidence with signals on any one or more of lines 95, if any. If a signal appears on any one or more of lines 95, such signal or signals will be transmitted by diodes 96 to render tube V1 conducting. The output from tube V1 will then be a negative pulse applied to one grid of the dual control tube V2 to render it nonconducting regardless of the synchronizing signal applied to the other grid via line 115. Thus, there is no output to tube V3 and no signal is applied to auxiliary memory read-in coil 132. If none of lines 95 contain a signal, thereby indicating absence of a character in that particular code column, V1 is held nonconducting and its output holds one grid of tube V2 in a conducting position. A signal on line 115 therefore renders the other grid conducting to permit tube V2 to conduct and apply a negative pulse to the grid of tube V3 which inverts the pulse to apply a positive pulse to auxiliary memory read-in coil 132. Although such a circuit is shown in conjunction with each of ring chains 114 corresponding to a code column, a single Or circuit 119 can be utilized in a manner similar to circuits 109.

An auxiliary memory means 130 comprising a core 131, read-in coil 132, read-out coil 133 and an output coil 134 is associated with each group of memory means 121 into which a signal may possibly be read. The read-in coil 132 has one side thereof connected to Or circuit 119 via plug 126 and socket 116 and the other side connected to the anode of thyratron 128. Read-out coil 133 is serially connected with the read-out coils 124 associated with the preceding memory unit, the anode of thyratron 135 and voltage source 136. Output coils 134 have one side thereof connected to ground and the other side connected by line 171 to the grid of control tube 138, see Fig. 9. As shown schematically in Fig. 6, each of auxiliary memories 130 is associated with a group of memory means 121 and a unit of a second ring chain 140 which controls the read-out of any signals stored in the memory units.

Figure 11:
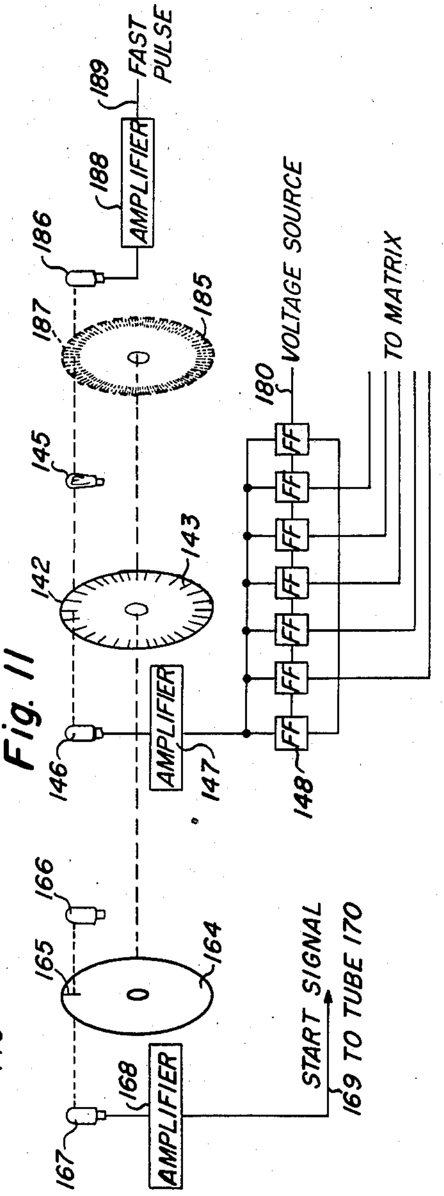
Fig. 11 is a detail view of the means for providing the periodic pulses to the ring chain shown in Fig. 9 and the two sets of periodic pulses in Fig. 10.

Fig. 11 discloses means for providing periodic pulses to ring chain 140 and to matrix 141, as described hereinafter. A revolving disc 142 provided with slots 143 and synchronized with the movement of tape 144 in the printer has a light source 145 arranged on one side thereof and a light responsive cell 146 on the other side, the cell 146 being energized by the light transmitted through the slots. The synchronization is such that for each character seven pulses are delivered by cell 146. These pulses are amplified by circuit 147 and delivered to ring chain 140 by means of seven flip-flop circuits 148 which are connected so that pulses are sent from each in turn. Flip-flop circuits 148 are substantially the same as the units of ring chain 140 disclosed in Fig. 8, and differ only in number, that is, circuit 148 comprises seven units whereas ring chain 140 has twenty-seven units. Five of these pulses are utilized to sequentially operate the printer and the seventh is utilized to step ring chain 140 once for every seven pulses and to pulse the voltage source 136, also note Fig. 2. Since each unit of chain 140 is connected to the control grid of its respective thyratron 135, energization of read-out coils 124 is also controlled by ring chain 140.

If for each column scanned, signals are delivered into one or more of read-in coils 123 of each group and read-out coils 124 are pulsed at any time thereafter, a signal is induced in each output coil 125 of the unit in which the direction of magnetization has been changed by the read-in coils. As a result, an electrical signal is applied to the respective common output leads 150. The delivery of a signal to any one of the read-in coils 123 in a group blocks Or circuit 119 and no signal is delivered thereby to the auxiliary memory 130 associated with the memory group of the next code column. If no signal is supplied to Or circuit 119, then this circuit delivers a signal to the auxiliary memory 130 of the next code column. If any of read-in coils 123 are not pulsed by a signal from distribution circuit 117 and read-out coils 124 are pulsed later, no signal will be induced in the output coils of such group. Successive groups of signals corresponding and individual to the characters to be printed are, therefore, sent out over lines 150.

The signals on output leads 150 are delivered to a group of flip-flop circuits which, in turn, deliver signals to a decoding circuit, then to a synthesizing circuit and to a matrix circuit 141, see Fig. 1. The signals delivered by the matrix 141 are delivered to coils 152 and 153 of magnetic driver 154 to actuate a plurality of stylii 155 which are pivotally mounted on a common axis at 156 for movement either singly or in combination toward platen roll 157. Tape 144 is advanced from a supply source together with carbon paper 158 and then separated beyond platen roll 157. For a more detailed description of the apparatus described, reference can be made to the above-mentioned patents and patent applications.

Figure 6:
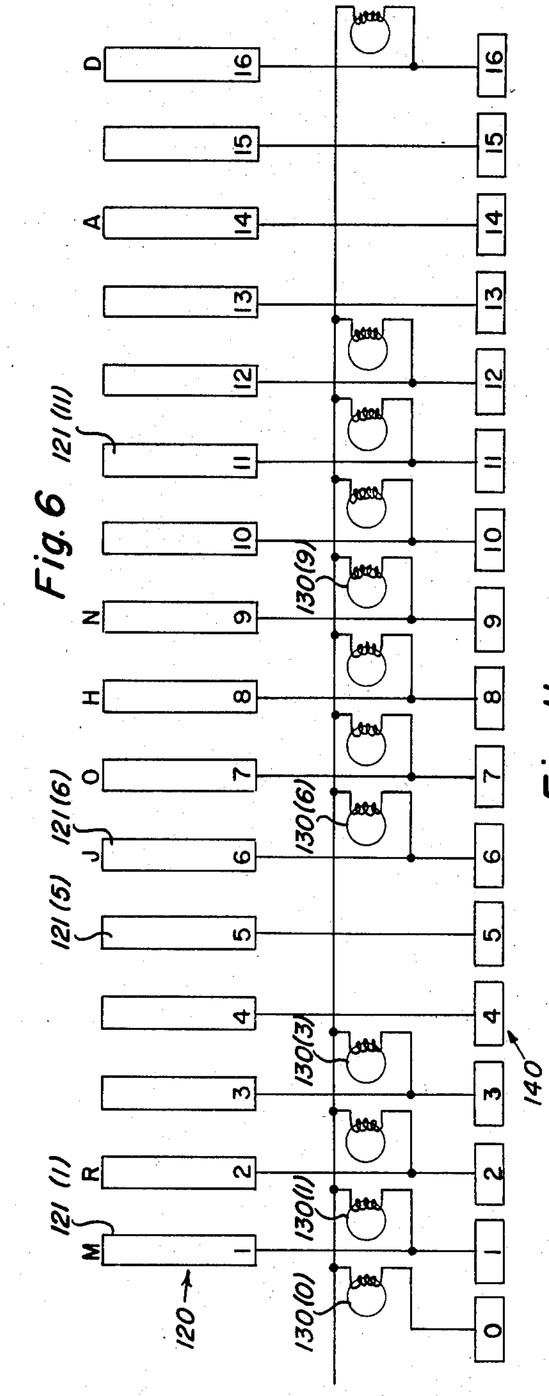
Fig. 6 is a schematic view showing the arrangement of the auxiliary memory with respect to the memory and ring chain units associated with each code line.
Figure 9:
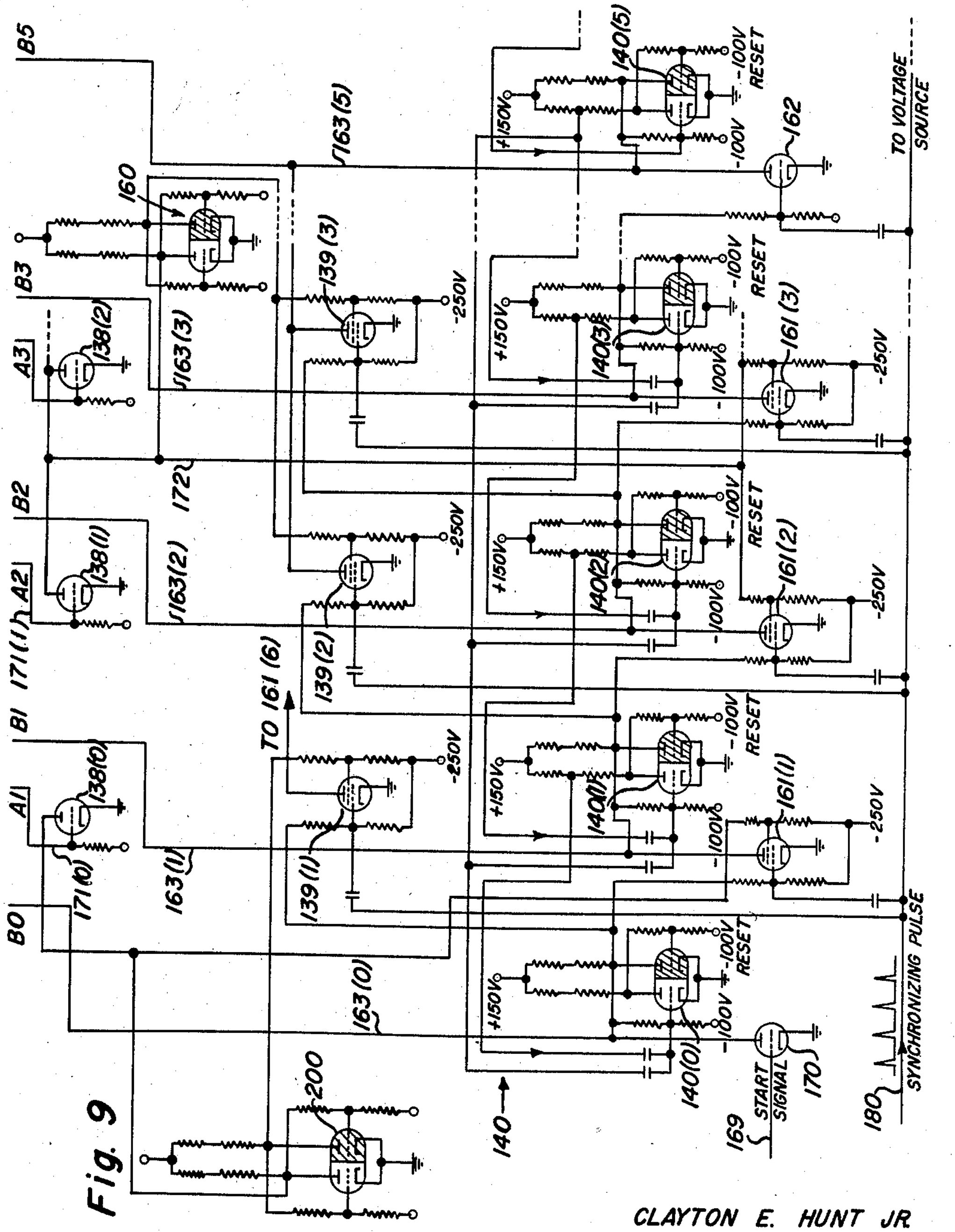
Fig. 9 is a circuit diagram of a number of units of the ring chain for read-out of the signals stored in the memory means and the control means for providing the predetermined spacing.

With respect to Fig. 9, ring chain 140 comprises a number of flip-flop circuits 140(0), 140(2), etc., which are normally conducting on the right-hand side. Associated with these circuits are control tubes 138(0), 138(1), etc., control tubes 139(0), 139(1), etc., and flip-flop circuits 160 and 200 which are also conducting on the right-hand side. The circuits disclosed in Fig. 9 show the arrangement and interconnections required for providing a predetermined spacing, in this instance a space equivalent to one character, between the last character in the title and the first character in the first name. It is to be understood that this same arrangement can be used between the other groups of characters in the other sections of card 100 in the same way. As shown in Fig. 6, the signals corresponding to the M appear in memory unit 121(1), to the R in memory unit 121(2), and to the J in memory unit 121(6). Since the signals for the R and J are stored in the memory units in accordance with the card columns, the columns therebetween must, therefore, be reduced to that of a single column or character in order to provide the required single space between these letters on the label.

If it is assumed that an eighty column card is to be used, that the cards are moved with the equivalent of the space between two code columns between successive cards, and that the card is to be divided into three sections, then each section can comprise twenty-five columns of code and each section will be separated by two columns in which no code will appear. The number of units in ring chain 114 will number eighty-two and the number of units in ring chain 140 will number twenty-seven in accordance with the number of character spaces between successive perforations in tape 144. Ring chain 114 is, therefore, associated with the number of code columns on card 100 and ring chain 140 is associated with the number of character spaces on the label, a maximum of twenty-four characters being capable of being printed on such label.

As described in my above-mentioned patent application Serial No. 474,169, the leading edge of the card entering the scanning or sensing seation delivers a signal to ring chain 114 to render it operative in timed relation to the read-in of signals for storage in memory 120. The flip-flop units of ring chain 140 are normally conducting on the right-hand side, and the bias on tubes 161 and 162 is such that they are biased far beyond cut-off so that the periodic pulses on line 180 from disc 142 have no effect. The anode of tube 170 is connected by line 163(0) to the control grid of thyratron 135(0) and to the anode of the normally nonconducting side of flip-flop 140(0). The signal delivered to tube 170 as a start signal is derived from disc 164 having a single slot 165 and which is rotated together with disc 142, as shown in Fig. 11. Disc 164 is arranged between light source 166 and photocell 167, the signal being derived from the light transmitted through slot 165 and falling on cell 167. This signal is then amplified by any conventional amplifier circuit 168, and the amplified signal is directed by line 169 to the grid of tube 170. While the number of units in chain 114 and chain 140 are different in number, the time required for each chain to complete its cycle is the same. However, chain 140 cannot start the read-out until after the first character in the last section has been read in and must be started before the last character in this section has been scanned, by this arrangement read-in and read-out can be occurring at the same time. This delay in read-out is necessary so that all three lines on the label can be printed simultaneously. The signal delivered to tube 170 by disc 164 is synchronized so that tape 144 is positioned to receive the first character in proper spaced relation to the perforation in the tape. This is accomplished by starting movement of the tape before read-out of the character signals stored in memory 120 and is described more fully in my above-mentioned patent application.

Assuming that memory 121(1) has signals stored therein, the pulse on line 180 to voltage source 136 and which follows the start signal on line 169 causes a pulse to be delivered from said voltage source to read-out coils 124(1) which, in turn, causes the direction of magnetization in any of cores 122(1) in which a signal has been stored by read-in coils 123(1) to be reversed. As a result, the corresponding output coils 125(1) will deliver an electrical signal to the corresponding lines 150. At the same time, the pulse from voltage source 136 will be applied to read-out coil 133(1) of auxiliary memories 130(1). If it is assumed that signals corresponding to M were read into cores 122(1) corresponding thereto and corresponding to R were read into cores 122(2), then Or circuit 119 will not have delivered any signal to either of auxiliary memories 130(0), 130(1) or 130(2). As a result, no signal will be delivered by output coils 134(0) of auxiliary memory 130(0) nor will any signal be derived from output coils 134(1) and 134(2) of auxiliary memories 130(1) and 130(2).

The slot 165 in disc 164, which is rotated with disc 142, is arranged between two of the slots 143 in disc 142 in order to provide a start signal which will be impressed on the grid of tube 170 between any two successive pulses derived from disc 142 and delivered to line 180. The signal delivered to tube 170 via line 169 renders this tube conductive and the decrease in plate potential causes thyratron 135(0) to fire. The conduction of tube 170 also causes flip-flop 140(0) to switch, the switching causing tube 161(1) to be rendered receptive to the first pulse appearing on line 180. Conduction of tube 135(0) impresses a pulse in read-out coil 133(0) and if a signal has been delivered to anyone or any combination of memories 121(1), Or circuit 119 will not have delivered a pulse to read-in coil 132(1) and no signal will be derived from output coil 134(0). On the other hand, if no signal has been delivered to any of memories 121(1), the Or circuit 119 will have pulsed read-in coil 132(0) and a signal will then be derived from output coil 134(0) to cause tube 138(0) to become conductive. Conduction of tube 138(0) results in flip-flop circuit 200 being switched and tube 161(1) being returned to its normal condition in which it is biased far beyond cutoff. The switching of flip-flop 200 also causes tube 139(1) to become conducting and it, in turn, renders tube 161(6) receptive to the first pulse appearing on line 180 after the start pulse on line 169. This first pulse on line 180 causes tube 161(6) to become conductive and read-out of memory 121(6) then occurs first. By this arrangement auxiliary memory 130(0) determines whether read-out of the signals will commence with memories 121(1) or 121(6). Since the first letter of the title, first name, etc. will be coded in the first line of its respective field or area, there is the possibility that the title in the first line to be printed may not be punched in some of the cards. This circuitry will be more fully understood from the description which follows with respect to the read-out of the signals from the other stages of the memories 121 in which there has been no omission of the title. It is to be understood that the circuitry which is disclosed in Figs. 8 and 9 and which comprise the tubes 138(3), 139(3), 140(3) and 161(3) is also associated with memory 121(4) and is not shown in either of these two figures of the drawings.

The decrease in plate potential of tube 170 causes the left-hand side of tube 140(0) to become conducting and the right-hand side to become nonconducting. This switching of tube 140(0) causes the bias on tube 161(1) to be reduced to render it receptive to the first pulse on line 180 following the start signal on line 169. This pulse on line 180 is blocked from all tubes 161 with the exception of tube 161(1) and renders this tube conductive, the reduction in plate potential causing thyratron 135(1) to fire whereby a pulse initiated by the pulse in line 180 causes read-out coils 124(1) to induce signals in output coils 125(1) which are delivered to the lines 150 corresponding to the signals stored in cores 122(1) and which are individual to the character M. The pulse to read-out coils 124(1) is also directed to read-out coil 133(1) of auxiliary memory unit 130(1). Since a character has been read into memory 121(2), that is, for the letter R, Or circuit 119 will not have delivered a signal to read-in coil 132(1). As a result, with the read-out of memory 121(1) no signal is delivered by output coil 134(1) to the grid of control tube 138(1) via line 171(1).

The conduction of tube 161(1) also causes flip-flop circuit 140(1) to switch, this switching rendering tube 161(2) receptive to the second pulse on line 180 and resetting flip-flop 140(0) to its normal condition. The second pulse on line 180 is, therefore, received only by tube 161(2) and renders this tube conductive, flip-flop 140(1) being switched to its normal condition and tube 161(3) being rendered conductive to the third pulse on line 180. Conduction of tube 161(2) renders tube 135(2) conductive whereby a pulse is delivered to read-out coil 131(2) of auxiliary memory 130(2) and to read-out coils 124(2) of memory 121(2). The output coils 125(2) then delivers signals corresponding to the letter R to the corresponding lines 150. Since no signals have been delivered to memory 121(3), Or circuit 119 has delivered a signal to read-in coil 132(2) of auxiliary memory 130(2), thereby designating the lack of any signals in memory 121(3). As a result, the change in magnetization in core 131(2) by read-out coil 133(2) induces a signal in output coil 134(2) which renders tube 138(2) conductive.

The decrease in plate potential of tube 138(2) causes the left-hand side of flip-flop circuit 160 to become conducting and the right-hand side nonconducting.

With the conduction of tube 161(2) as stated above, the conduction of flip-flop 140(2) is switched so that tube 161(3) is rendered receptive to the third pulse on line 180 and flip-flop 140(1) is reset to its normal state. The anodes of tubes 138 are connected to the suppressor grids of tubes 161 via line 172 as well as to the left anode of flip-flop 160. As a result, whenever one of tubes 138(1), (2) or (3) is made conductive, one of tubes 161 has already been made receptive to a pulse on line 180. This tube is, however, again reverted to its blocking condition and the preceding flip-flop 140 is switched to its normal condition. Also, since flip-flop 160 was switched by conduction of tube 138(2), the bias on tubes 139 is reduced so that the third pulse on line 180 is delivered to tubes 139 and the output thereof is delivered to line 163(5). The output from tubes 139 causes flip-flop 140(5) to switch whereby the next control tube 161(6) will be receptive to the fourth pulse on line 180 as well as causing read-out of any signals in the memory units associated with the fifth column of code. As shown in Figs. 3 and 6, memory 121(5) corresponds to a blank line to provide the necessary space between the last character of the title and the first character of the first name. Accordingly, no signals will have been read into memory unit 121(5) and a space corresponding to a single character will appear on the label between the R and J, as seen in Fig. 5, rather than three such spaces.

From the foregoing description and drawings, it is evident that flip-flop circuit 160 is connected to both control tubes 139 and 161 so that in the normal state of said circuit, control tubes 161 and 162 are responsive to the signals on line 180 and when flip-flop 160 is switched by a signal read-out of any one of auxiliary memories 130, control tubes 139 are operative and tubes 161 are not. Referring to Figs. 6, 8 and 9, as one of flip-flop circuits 140 is switched by a pulse on line 180, the corresponding memory 121 is read out together with the auxiliary memory 130 associated with the next code column. If a signal is stored in the memory next to the one being read-out, flip-flop circuit 160 will not be switched. However, if the next memory unit has no signal stored therein, then Or circuit 119 will have read a signal into the auxiliary memory. The next signal on line 180 is, therefore, directed by tubes 139 to the code column associated with the blank code column between the groups of characters. In the above description, if the title had been MRS instead of MR, there would have been no signal in auxiliary memory 130(1) when memory 121(2) was read out because the S would have been read into memory 121(3). However, a signal would then have been derived from auxiliary memory 130(3) upon read-out of memory 121(3) and the succeeding pulse would then have been directed to memory 121(5) instead of providing for read-out of memory 121(4) which is not shown in Figs. 8 and 9. In the event the title comprises four letters, such as MISS, switching of flip-flop circuit 160 cannot occur and flip-flop circuit 140(4) will then render tube 162 receptive to the fifth pulse on line 180 for read-out of memory 121(5). This will result in a space occurring between the last S and the first letter in the first name on the label since no signals are stored in memory 121(5). For this reason, each area of card 100, with the possible exceution of the first area associated with each line to be printed, is plugged so that memories 121 will provide a code column in which no code is recorded in order to obtain a spacing between the characters in two adjacent areas associated with the same line. For example, as just described and shown in Fig. 6 for the first line of label 106, memories 121(5), 121(13) and 121(15) will not be plugged to sockets 116 so that this spacing will exist irrespective of the arrangement of the code on card 100. By this arrangement, two characters, such as the middle initial A and the first letter D of the last name, can be separated by proper plugging of memories 121 with respect to distribution means 117 since read-in of the signals to memories 121 occurs before read-out. In this instance, signals representative of the A will be read into memory 121(14) and signals representative of the D and immediately following those of A will be read into memory 121(16). Memory 121(15) will, therefore, not be plugged into distribution means 117 and will have no signals stored therein on read-in. On read-out of memories 121, however, memory 121(15) will provide the space between A and D when printed on the label and as shown in Fig. 6.

A similar arrangement of control tubes 138 and 139 together with a flip-flop circuit 160 is arranged in the same manner with respect to the other groups of characters; such as, first name, surname, number, street, city and state. In each instance, the space between the last character in one group and the first character in the next group is the space equivalent to one character so that a label 106 of the type shown in Fig. 5 is printed irrespective of the spacing between the same characters as punched in card 100. It should be understood, of course, if more than one such space is required, it is merely a matter of adapting the circuitry just described to obtain any desired predetermined spacing.

Figure 10:
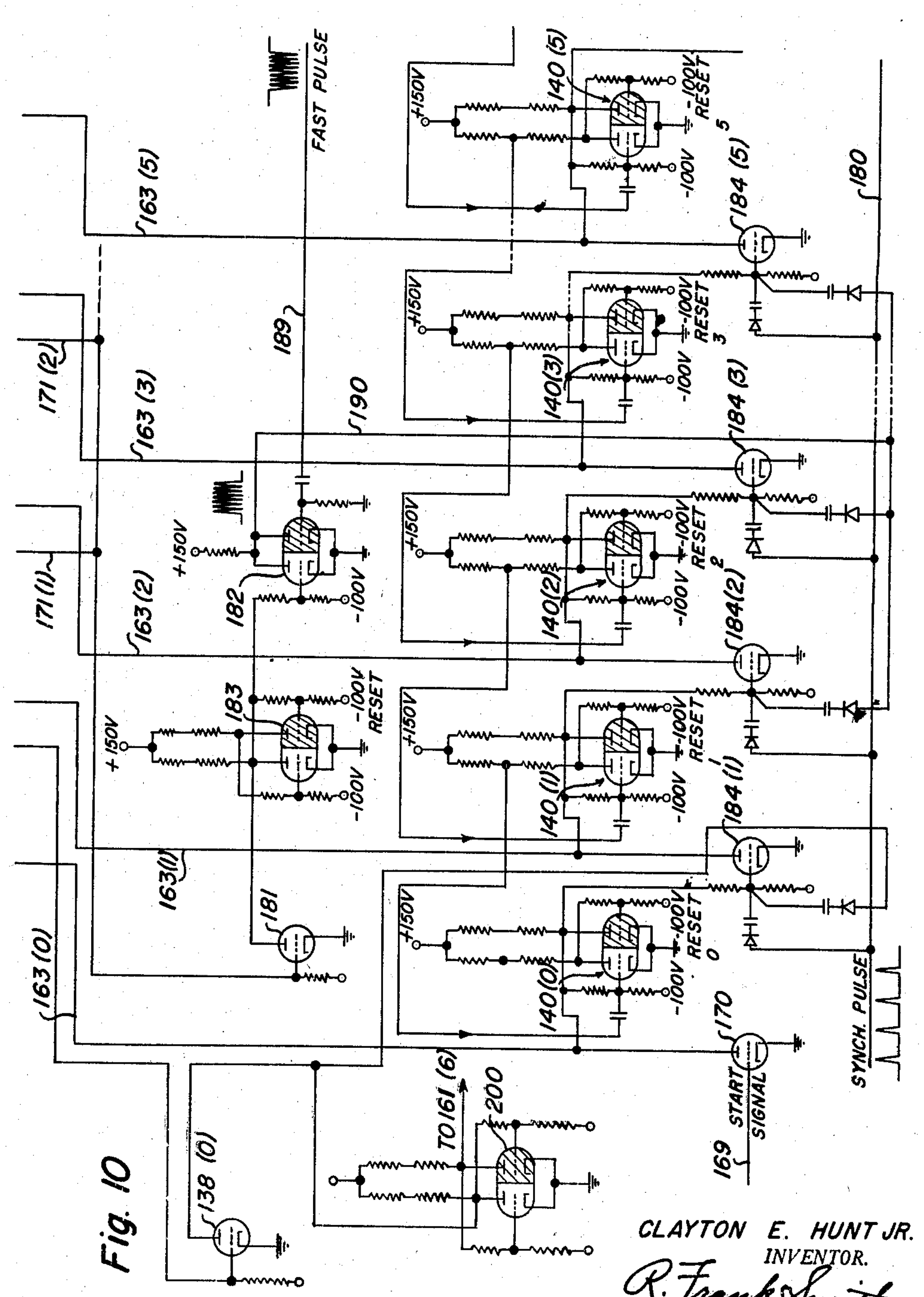
Fig. 10 is a circuit diagram similar to Fig. 9 showing another embodiment of the control means for providing the predetermined spacing.

In Figs. 10 and 11 another embodiment of the invention is disclosed in which tubes 138 are replaced by a single tube 181 and a gating circuit 182 which is used in conjunction with a flip-flop circuit 183. Also, control tubes 161 are replaced by triode tubes 184. As shown in Fig. 11, a third disc 185 is mounted for rotation with discs 142 and 164 between lamp 145 and photocell 186. Disc 185 is provided with a plurality of radial slots 187 and the light transmitted by said slots is converted by cell 186 into electrical pulses which are amplified by circuit 188, the output being delivered via line 189 to gating circuit 182. The number of slots in disc 185 is a multiple of the number of slots in disc 142, the multiple being at least equal to the largest number of spaces that may have to be contracted between any two groups of characters in the columns on card 100. Since discs 142 and 185 are rotated in synchronism, the number of pulses on line 189 between any two consecutive pulses on line 180 will be equivalent to the chosen multiple. For this reason, the pulses on line 189 have been designated fast pulses.

As in the preferred embodiment, the signals derived from card 100 and converted by circuit 108 are distributed by circuit 117 to the respective sockets 116 and by plugs 126 to the proper memory means 121. The start signal for read-out of the signals stored in memories 121 is derived from disc 164 and delivered via line 169 to the grid of tube 170 to render it conductive. As described above, the conduction of tube 170 causes flip-flop 140(0) to switch thereby reducing the bias on tube 184(1) to make it receptive to the first pulse on line 180. Also, thyratron 135(0) is fired and read-out coil 133(0) is pulsed through voltage source 136. Since as assumed above signals have been read into memory 121(1) and 121(2), output coils 125(1) and 125(2) will provide signals over the corresponding leads 150 with the first and second pulses on line 180. As in the embodiment described above, auxiliary memory 130(0), tube 138(0) and flip-flop circuit 200 provide the control for establishing whether the first character to be printed is read out of memory 121(1) or 121(6).

The first pulse on line 180 which follows the start pulse on line 169 is delivered to the grid of control tube 184(1), providing the first character to be printed is stored in memory 121(1), the other tubes 184(2), (3), (4) and (5) being blocked by flip-flops 140. This first pulse on line 180 renders tube 184(1) conductive and flip-flop 140(1) is switched to render control tube 184(2) receptive to the second pulse, and flip-flop 140(0) is reset. With the conduction of tube 184(1), thyratron 135(1) is fired and voltage source 136 provides a pulse to read-out coils 124(1) and 133(1). Since it has been assumed that signals have been read into memory 121(1), output coils 125(1) storing said signals will provide signals to the corresponding leads 150. If it is assumed, as in the description for the previous embodiment, that an M was coded in the first column on card 100 and an R was coded in the second column, then no signal will have been read into memory 121(3) and Or circuit 119 will have read a signal into read-in coil 132(2) of auxiliary memory 130(2). The second pulse on line 180 renders tube 184(2) conductive, switches flip-flop circuit 140(2) to render tube 184(3) receptive to the third pulse, resets flip-flop circuit 140(1) and causes tube 135(2) to fire. Read-out coils 124(2) and read-out coil 133(2) are therefore pulsed and the signals stored in memory 121(2) corresponding to the letter R are delivered to the corresponding lines 150. Since no signals are stored in memory 121(3), Or circuit 119 stores a signal in read-in coil 132(2) of auxiliary memory 130(2) and output coil 134(2) delivers a signal via line 171(2) to the grid of tube 181 to render this tube conductive. As a result, with the output from coils 125(2) an output signal will also be derived from coil 134(2). Conduction of tube 181 causes flip-flop 183 to switch thereby rendering And circuit 182 receptive to the fast pulses on line 189. These pulses are delivered via line 190 to the control grids of tubes 184. The first fast pulse renders tube 184(3) conductive, thereby switching flip-flop 140(3) to render tube 184(4) conductive and resetting flip-flop 140(2). The second fast pulse renders tube 184(4) conductive, thereby switching flip-flop 140(4) to render tube 184(5) conductive and resetting flip-flop 140(3). Since there is no auxiliary memory associated with memory 121(5), tube 181 then reverts to its nonconducting state, flip-flop circuit 183 is switched to its normal condition and gating circuit 182 serves to block any further pulses on line 189. Tube 184(5) is then rendered conductive by the third pulse on line 180. By this arrangement, each unit of chain 140 is stepped, either by successive pulses on line 180 when signals are stored in any one of memories 121 or by a plurality of pulses on line 189 between any two successive pulses on line 180 when no signals are stored in memories 121 beyond the last character.

In both of the foregoing descriptions, the space provided on the label between the last character in one group and the first character in the next group is equivalent to one character. As noted hereinbefore, this spacing can be increased by merely adapting the circuitry described to the spacing required. While other modifications of the invention will be apparent to those skilled in the art, it is to be understood that the embodiments described are merely illustrative of the invention, and the scope of the invention is defined by the appended claims.

Having now particularly described my invention, what I desire to secure by Letters Patent of the United States and what I claim is:

1. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected to the distribution means associated with the next code line and receiving an electrical signal from said distribution means only when no electrical signal is delivered to its associated memory means, circuit means associated with each of said areas and connected to each of said memory means and said auxiliary memory means and including a pulse generating means for providing two series of periodic pulses, said circuit means being responsive to one series of pulses for initiating and reading out said electrical signals successively from said memory means in a predetermined relation to said electrical signals received from said distribution means and for reading out any electrical signal in said auxiliary memory means, switching means interconnecting said circuit means of each of said areas and responsive to the other series of pulses for rendering the circuit means of the next and adjacent area receptive to said one series of pulses between any two of said one series of pulses for establishing said predetermined spacing, control means responsive to the first electrical signal derived from any one of said auxiliary memory means associated with one of said areas for rendering said switching means receptive to said other series of pulses, and means responsive to the electrical signals read out of said memory means for printing characters in accordance with the code in each column and with said predetermined spacing between the characters in each designated area.

2. A device in accordance with claim 1 wherein said circuit means includes means for providing a series of periodic pulses, each pulse causing simultaneous and successive read-out of the electrical signals stored in said memory means associated with each code column and of any electrical signal stored in the auxiliary memory means by said distribution means associated with the next code column, a trigger circuit associated with each of said memory means, a control tube associated with each of said trigger circuits and normally blocking said trigger circuit to said periodic pulses, and means for deriving a signal to initiate said first trigger circuit and render the control tube associated with the following trigger circuit receptive to said periodic pulses, each of said trigger circuits thereafter being successively responsive to successive ones of said periodic pulses whereby the control tube associated with the next trigger circuit is rendered receptive to said periodic pulses and the preceding trigger circuit is reset.

3. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected to the distribution means associated with the next code line and receiving an electrical signal from said distribution means only when no electrical signal is delivered to its associated memory means, circuit means associated with each of said areas and connected to each of said memory means and said auxiliary memory means and including a pulse generating means for providing two series of periodic pulses, said circuit means being responsive to one series of pulses for initiating and reading out said electrical signals successively from said memory means in a predetermined relation to said electrical signals received from said distribution means and for reading out any electrical signal in said auxiliary memory means, switching means interconnecting said circuit means of each of said areas and responsive to the other series of pulses for rendering the circuit means of the next and adjacent area receptive to said one series of pulses between any two of said one series of pulses for establishing said predetermined spacing, control means associated with each of said areas and responsive to the first electrical signal derived from any one of said auxiliary memory means for rendering said switching means receptive to said other series of pulses, a second control means associated with each of said areas and responsive to said other series of pulses for blocking said circuit means in its respective area and rendering said next circuit means receptive to said one series of pulses for read-out of the electrical signals in said next area, and means responsive to the electrical signals read out of said memory means for printing characters in accordance with the code in each column and with said predetermined spacing between the characters in each designated area.

4. A device in accordance with claim 3 wherein said second control means comprises a control tube associated with each of said circuit means, the anodes of said tubes being serially connected to the memory means and to the circuit means associated with one of the code columns in the next and adjacent area to establish said predetermined spacing, and any one of said tubes being rendered receptive by said switching means to said other series of pulses for blocking its associated circuit means and initiating the first-mentioned control means associated with the next and adjacent area.

5. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected to the distribution means associated with the next code line and memory means receiving an electrical signal from said distribution means only when no electrical signal is delivered to its associated memory means, a ring chain having one unit thereof associated with each of said memory means and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal stored in the auxiliary memory means by said distribution means associated with the next code line, means for deriving a signal to initiate the first unit in said ring chain, said units thereafter being initiated successively by said periodic pulses and each unit, upon being initiated, rendering the control tube associated with the following unit receptive to the succeeding periodic pulse and resetting the preceding unit, means associated with each of said areas for switching said ring chain to the unit thereof associated with the memory means of one of said code columns in the next and adjacent code area for establishing said predetermined spacing, control means associated with each of said areas and responsive to the first electrical signal derived from any one of said auxiliary memory means for initiating said switching means, a second control means associated with each of said areas and responsive to said first control means for blocking said ring chain in its respective area and responsive to the next periodic pulse for transferring read-out of said electrical to the unit associated with said one code column in the next designated area, and means responsive to the electrical signals read out of said memory means for printing characters in accordance with the code in each column and with said predetermined spacing between the characters in each designated area.

6. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signal in said same predetermined order, an auxiliary memory means associated with each of said memory means and only those of each area in which a possible electrical signal is to be stored, each of said auxiliary memory means being interconnected to the distribution means associated with the next code line and receiving an electrical signal from said distribution means only when no electrical signal is delivered to its associated memory means, means for providing a series of periodic pulses to successively read-out the electrical signals stored in said memory means, a trigger circuit associated with each of said memory means, a control tube associated with each of said trigger circuits and normally blocking its respective trigger circuit to said periodic pulses, each of said trigger circuits conditioning the control tube associated with the next trigger circuit to render said control tube receptive to the succeeding periodic pulse and resetting the preceding trigger circuit, means for deriving a sginal to initiate the first trigger circuit, a second control tube associated with each of said auxiliary memory means, the anodes of said second control tubes being serially connected and said tubes being responsive to the signal read-out from any one of said auxiliary memory means, a third control tube associated with each of said trigger circuits, the anodes of said tubes being serially connected to the memory means and the first-mentioned control tube and trigger circuit associated with the first possible code column in the next and adjacent area for establishing said predetermined spacing, a single trigger circuit responsive to a signal from any of said second control tubes for rendering the corresponding third control tube receptive to the next periodic pulse, resetting the preceding trigger circuit, and resetting said first control tube to its blocking condition, said third control tube, upon receipt of said next periodic pulse, transferring the read-out of said electrical signals to said next and adjacent area, and means responsive to the electrical signals read-out of said memory means for printing characters in accordance with the code in each column and with said predetermined spacing between the characters in each designated area.

7. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected to the distribution means associated with the next code line and receiving an electrical signal from said distribution means only when no electrical signal is delivered to its associated memory means, a ring chain having one unit thereof associated with each of said memory means and successively responsive to periodic pulses for read-out of the electrical signals stored in said memory means, a control tube associated with each of said units for normally blocking its respective unit to said periodic pulses, means for providing a first plurality of periodic pulses to said ring chain and to said memory means for initiating read-out of said electrical signals successively from said memory means in a predetermined relation to said electrical signals received from said distribution means and the read-out of any electrical signal in the associated auxiliary memory means and a second plurality of periodic pulses to said ring chain for rapidly stepping the units of said ring chain, the number of said second-mentioned pulses occurring between successive ones of said first-mentioned pulses and being at least equal in number to the largest number of possible code columns between any two of said adjacent areas, means for blocking said second plurality of periodic pulses from said ring chain, means for deriving a signal to initiate the first unit in said ring chain, said units thereafter being initiated successively by said periodic pulses and each unit, upon being initiated, rendering the control tube associated with the following unit receptive to the succeeding periodic pulse and resetting the preceding unit, means responsive to the signal read out of any one of said auxiliary memory means for releasing said blocking means to permit said second plurality of periodic pulses to rapidly step said ring chain and render the control tube associated with one of the code columns in the next and adjacent area receptive to the next of said first plurality of periodic pulses to establish said predetermined spacing, and means responsive to the electrical signals read-out of said memory means for printing characters in accordance with the code in each column and with said predetermined spacing between the characters in each designated area.

8. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected with the distribution means associated with the next code line and receiving an electrical signal from said distribution means only when no electrical signal is delivered to its associated memory means, a ring chain having one unit thereof associated with each of said memory means and successively responsive to periodic pulses for read-out of the electrical signals stored in said memory means, a control tube associated with each of said units for normally blocking its respective units to said periodic pulses, means for providing a first plurality of periodic pulses to said ring chain and to said memory means for initiating read-out of said electrical signals successively from said memory means in a predetermined relation to said electrical signals received from said distribution means and the read-out of any electrical signal in the associated auxiliary memory means and a second plurality of periodic pulses to said ring chain for rapidly stepping the units of said ring chain, the number of said second-mentioned pulses occurring between successive one of said first-mentioned pulses and being at least equal in number to the largest number of possible code columns between any two of said adjacent areas, means for deriving a signal to initiate the first unit in said ring chain, said units thereafter being initiated successively by said periodic pulses and each unit, upon being initiated, rendering the control tube associated with the following unit receptive to the succeeding periodic pulse and resetting the preceding unit, an electronic gating circuit connected to said control tubes and normally blocking transmission of said second plurality of periodic pulses thereto, control means responsive to a signal read-out of any one of said auxiliary memory means for unblocking said gating circuit to permit said second plurality of periodic pulses to rapidly step the remaining units of said ring chain associated with its respective designated area and to render the control tube associated with one of the code columns in the next and adjacent area receptive to the next of said first plurality of periodic pulses to establish said predetermined spacing, and means responsive to the electrical signals read out of said memory means for printing characters in accordance with the code in each column and with said predetermined spacing between the characters in each designated area.

9. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected to the distribution means associated with the next code line and receiving an electrical signal from said distribution means only when no electrical signal is delivered to its associated memory means, control means responsive to said initiating means and associated with the memory means of the first code line of the first area and the first code line of a second area for determining the area from which the read-out of said electrical signals is to first occur, means associated with each of said memory means and said auxiliary memory means for initiating the read-out of said electrical signals successively from said memory means in a predetermined relation to said electrical signals received from distribution means and the read-out of any electrical signal in said auxiliary memory means, means associated with each of said areas for switching said initiating means to said memory means associated with one of the code columns in the next and adjacent area for establishing said predetermined spacing, a second control means responsive to the first electrical signal derived from any one of said auxiliary memory means associated therewith for initiating said switching means, and means responsive to the electrical signals read out of said memory means for printing characters in accordance with the code in each column and with said predetermined spacing between the characters in each designated area.

10. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which a possible electrical signal is to be stored, each of said auxiliary memory means being interconnected to the distribution means associated with the next code line and receiving an electrical signal from said distribution means only when no electrical signal is delivered to its associated memory means, means for providing a series of periodic pulses to successively read-out the electrical signals stored in said memory means, a trigger circuit associated with each of said memory means, a control tube associated with each of said trigger circuits and normally blocking its respective trigger circuit to said periodic pulses, each of said trigger circuits conditioning the control tube associated with the next trigger circuit to render said control tube receptive to the succeeding periodic pulse and resetting the preceding trigger circuit, means for deriving a signal to initiate the first trigger circuit, control means responsive to said initiating means and associated with the memory means of the first code line of the first area and the first code line of a second area for determining the area from which the read-out of said electrical signals is to first occur, a second control tube associated with each of said auxiliary memory means, the anodes of said second control tubes being serially connected and said tubes being responsive to the signal read-out from any one of said auxiliary memory means, a third control tube associated with each of said trigger circuits, the anodes of said tubes being serially connected to the memory means and the first-mentioned control tube and trigger circuit associated with the first possible code column in the next and adjacent area for establishing said predetermined spacing, a single trigger circuit responsive to a signal from any of said second control tubes for rendering the corresponding third control tube receptive to the next periodic pulse, resetting the preceding trigger circuit, and resetting said first control tube to its blocking condition, said third control tube, upon receipt of said next periodic pulse, transferring the read-out of said electrical signals to said next and adjacent area, and means responsive to the electrical signals read out of said memory means for printing characters in accordance with the code in each column and with said predetermined spacing between the characters in each designated area.

11. A device for providing a predetermined spacing between the characters represented by code arranged in successive columns and in adjacent areas of a medium, each of said areas having a predetermined number of code columns, comprising means for scanning said medium and delivering output pulses in accordance with the code in each column and individual to the character represented thereby, distribution means for receiving said output pulses and delivering electrical signals representative of the coded character in each of said columns, memory means associated with each code column in each designated area and connected to said distribution means in any predetermined order for read-out of said electrical signals in said same predetermined order, an auxiliary memory means associated with each of said memory means and only those of each area in which there are to be possible code columns, each of said auxiliary memory means being interconnected with the distribution means associated with the next code line and receiving an electrical signal from said distribution means only when no electrical signal is delivered to its associated memory means, a ring chain having one unit thereof associated with each of said memory means and successively responsive to periodic pulses for read-out of the electrical signals stored in said memory means, a control tube associated with each of said units for normally blocking its respective units to said periodic pulses, means for providing a first plurality of periodic pulses to said ring chain and to said memory means for initiating read-out of said electrical signals successively from said memory means in a predetermined relation to said electrical signals received from said distribution means and the read-out of any electrical signal in the associated auxiliary memory means and a second plurality of periodic pulses to said ring chain for rapidly stepping the units of said ring chain, the number of said second-mentioned pulses occurring between successive one of said first-mentioned pulses and being at least equal in number to the largest number of possible code columns between any two of said adjacent areas, means for deriving a signal to initiate the first unit in said ring chain, said units thereafter being initiated successively by said periodic pulses and each unit, upon being initiated, rendering the control tube associated with the following unit receptive to the succeeding periodic pulse and resetting the preceding unit, circuit means interconnecting the first code line of the first area and the first code line of a second area and including a control memory means associated with the distribution means of the first code line in the first area, said circuit means being responsive only to a signal derived from said control memory means for shifting the read-out of said electrical signals from said first area to said second area, an electronic gating circuit connected to said control tubes and normally blocking transmission of said second plurality of periodic pulses thereto, control means responsive to a signal read-out of any one of said auxiliary memory means for unblocking said gating circuit to permit said second plurality of periodic pulses to rapidly step the remaining units of said ring chain associated with its respective designated area and to render the control tube associated with one of the code columns in the next and adjacent area receptive to the next of said first plurality of periodic pulses to establish said predetermined spacing, and means responsive to the electrical signals read out of said memory means for printing characters in accordance with the code in each column and with said predetermined spacing between the characters in each designated area.

References Cited in the file of this patent

UNITED STATES PATENTS

| | | |
|---|---|---|
| Re. 23,713 | Hunt | Sept. 23, 1953 |
| 2,575,017 | Hunt | Nov. 13, 1951 |